(12) United States Patent
Leone et al.

(10) Patent No.: US 8,141,356 B2
(45) Date of Patent: Mar. 27, 2012

(54) ETHANOL SEPARATION USING AIR FROM TURBO COMPRESSOR

(75) Inventors: Thomas G. Leone, Ypsilanti, MI (US); Robert A. Stein, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 868 days.

(21) Appl. No.: 12/014,952

(22) Filed: Jan. 16, 2008

(65) Prior Publication Data

US 2009/0178654 A1 Jul. 16, 2009

(51) Int. Cl.
*F02D 23/00* (2006.01)
*F02D 41/00* (2006.01)
*F02B 33/44* (2006.01)
*F02B 23/00* (2006.01)
*F02B 47/00* (2006.01)
*F02B 43/00* (2006.01)
*F02B 13/00* (2006.01)
*F02M 15/00* (2006.01)

(52) U.S. Cl. .......... 60/601; 60/605.1; 123/1 A; 123/528; 123/540; 123/575; 123/704

(58) Field of Classification Search .................. 60/601, 60/605.1; 123/1 A, 540, 528, 575, 704
See application file for complete search history.

(56) References Cited

U.S. PATENT DOCUMENTS

| | | |
|---|---|---|
| 2,221,405 A | 11/1940 | Nallinger |
| 3,589,348 A | 6/1971 | Reichhelm |
| 3,794,000 A | 2/1974 | Hodgkinson |
| 4,031,864 A | 6/1977 | Crothers |
| 4,136,652 A | 1/1979 | Lee |
| 4,205,650 A | 6/1980 | Szwarcbier |
| 4,256,075 A | 3/1981 | Fukui et al. |
| 4,311,118 A | 1/1982 | Slagle |
| 4,325,329 A | 4/1982 | Taylor |
| 4,331,121 A | 5/1982 | Stokes |
| 4,402,296 A | 9/1983 | Schwarz |
| 4,411,243 A | 10/1983 | Hardenberg et al. |
| 4,459,930 A | 7/1984 | Flory |
| 4,480,616 A | 11/1984 | Takeda |
| 4,489,596 A | 12/1984 | Linder et al. |
| 4,502,453 A | 3/1985 | Kabasin et al. |

(Continued)

FOREIGN PATENT DOCUMENTS

DE 19954979 A1 * 6/2001

(Continued)

OTHER PUBLICATIONS

Unknown Author, "Honda Making Significant Progress on HCCI Engine for Hybrid Application," http://www.greencarcongress.com/2005/10/honda_making_si.html, Oct. 28, 2005, 8 pages.

(Continued)

*Primary Examiner* — Thai Ba Trieu
(74) *Attorney, Agent, or Firm* — Allan J. Lippa; Alleman Hall McCoy Russell & Tuttle LLP

(57) ABSTRACT

Methods and systems for separating fuel and supplying the separated fuel to an engine are disclosed. In one example, alcohol is separated from a blend of alcohol and gasoline. The methods and systems may improve fuel separator operation by adjusting separator operation in response to engine operating conditions.

23 Claims, 9 Drawing Sheets

U.S. PATENT DOCUMENTS

| | | | |
|---|---|---|---|
| 4,590,904 A | 5/1986 | Wannenwetsch | |
| 4,648,367 A | 3/1987 | Gillbrand et al. | |
| 4,706,630 A | 11/1987 | Wineland et al. | |
| 4,810,929 A | 3/1989 | Strumbos | |
| 4,817,576 A | 4/1989 | Abe et al. | |
| 4,930,537 A | 6/1990 | Farmer | |
| 4,945,881 A | 8/1990 | Gonze et al. | |
| 4,962,789 A | 10/1990 | Benscoter | |
| 4,993,386 A | 2/1991 | Ozasa et al. | |
| 4,998,518 A | 3/1991 | Mitsumoto | |
| 5,017,826 A | 5/1991 | Oshima et al. | |
| 5,018,483 A | 5/1991 | Kashima et al. | |
| 5,044,331 A | 9/1991 | Suga et al. | |
| 5,044,344 A | 9/1991 | Tuckey et al. | |
| 5,056,490 A | 10/1991 | Kashima | |
| 5,056,494 A | 10/1991 | Kayanuma | |
| 5,060,610 A | 10/1991 | Paro | |
| 5,097,803 A * | 3/1992 | Galvin | 123/1 A |
| 5,111,795 A | 5/1992 | Thompson | |
| 5,131,228 A | 7/1992 | Mochizuki et al. | |
| 5,188,087 A | 2/1993 | Saito | |
| 5,204,630 A | 4/1993 | Seitz et al. | |
| 5,230,309 A | 7/1993 | Suga et al. | |
| 5,233,944 A | 8/1993 | Mochizuki | |
| 5,335,637 A | 8/1994 | Davis et al. | |
| 5,336,396 A | 8/1994 | Shetley | |
| 5,357,908 A | 10/1994 | Sung et al. | |
| 5,360,034 A | 11/1994 | Der Manuelian | |
| 5,408,979 A | 4/1995 | Backlund et al. | |
| 5,417,239 A | 5/1995 | Ford | |
| 5,469,830 A | 11/1995 | Gonzalez | |
| 5,477,836 A | 12/1995 | Hyodo et al. | |
| 5,508,582 A | 4/1996 | Sugimoto et al. | |
| 5,565,157 A | 10/1996 | Sugimoto et al. | |
| 5,694,908 A | 12/1997 | Hsu | |
| 5,740,784 A | 4/1998 | McKinney | |
| 5,782,092 A | 7/1998 | Schultalbers et al. | |
| 5,806,500 A | 9/1998 | Fargo et al. | |
| 5,875,743 A | 3/1999 | Dickey | |
| 5,887,566 A | 3/1999 | Glauber et al. | |
| 5,921,222 A | 7/1999 | Freeland | |
| 6,017,646 A * | 1/2000 | Prasad et al. | 429/434 |
| 6,042,955 A * | 3/2000 | Okamoto | 429/413 |
| 6,112,705 A | 9/2000 | Nakayama et al. | |
| 6,112,725 A | 9/2000 | McKinney | |
| 6,119,637 A | 9/2000 | Matthews et al. | |
| 6,189,516 B1 | 2/2001 | Hei Ma | |
| 6,213,086 B1 | 4/2001 | Chmela et al. | |
| 6,229,253 B1 | 5/2001 | Iwata et al. | |
| 6,234,123 B1 | 5/2001 | Iiyama et al. | |
| 6,237,339 B1 * | 5/2001 | Åsen et al. | 60/649 |
| 6,318,083 B1 | 11/2001 | Machida et al. | |
| 6,325,039 B1 | 12/2001 | Goto | |
| 6,382,225 B1 | 5/2002 | Tipton | |
| 6,494,192 B1 | 12/2002 | Capshaw | |
| 6,505,579 B1 | 1/2003 | Lee | |
| 6,553,974 B1 | 4/2003 | Wickman et al. | |
| 6,617,769 B2 | 9/2003 | Suzuki | |
| 6,619,242 B2 | 9/2003 | Kaneko | |
| 6,622,690 B2 | 9/2003 | Ando et al. | |
| 6,651,432 B1 | 11/2003 | Gray, Jr. | |
| 6,659,068 B2 | 12/2003 | Urushihara et al. | |
| 6,691,669 B2 | 2/2004 | Surnilla et al. | |
| 6,698,387 B1 | 3/2004 | McFarland et al. | |
| 6,711,893 B2 | 3/2004 | Ueda et al. | |
| 6,792,966 B2 | 9/2004 | Harvey | |
| 6,845,616 B2 | 1/2005 | Jauss | |
| 6,866,950 B2 * | 3/2005 | Connor et al. | 429/408 |
| 6,928,983 B2 | 8/2005 | Mashiki | |
| 6,951,202 B2 | 10/2005 | Oda | |
| 6,959,693 B2 | 11/2005 | Oda | |
| 6,972,093 B2 | 12/2005 | Partridge et al. | |
| 6,978,762 B2 | 12/2005 | Mori | |
| 6,988,485 B2 | 1/2006 | Ichise et al. | |
| 6,990,956 B2 | 1/2006 | Niimi | |
| 7,055,500 B2 | 6/2006 | Miyashita et al. | |
| 7,082,926 B2 | 8/2006 | Sadakane et al. | |
| 7,159,568 B1 | 1/2007 | Lewis et al. | |
| 7,178,503 B1 | 2/2007 | Brehob | |
| 7,225,787 B2 | 6/2007 | Bromberg et al. | |
| 7,255,080 B1 | 8/2007 | Leone | |
| 7,261,064 B2 | 8/2007 | Bhaisora et al. | |
| 7,278,396 B2 | 10/2007 | Leone et al. | |
| 7,287,492 B2 | 10/2007 | Leone et al. | |
| 7,287,509 B1 | 10/2007 | Brehob | |
| 7,293,552 B2 | 11/2007 | Leone et al. | |
| 7,337,754 B2 * | 3/2008 | Dearth et al. | 123/1 A |
| 7,389,751 B2 * | 6/2008 | Leone | 123/1 A |
| 7,426,907 B2 * | 9/2008 | Dearth et al. | 123/3 |
| 7,487,631 B2 * | 2/2009 | Cueman et al. | 123/1 A |
| 7,640,915 B2 * | 1/2010 | Cohn et al. | 123/435 |
| 7,647,899 B2 * | 1/2010 | Dearth et al. | 123/1 A |
| 7,665,428 B2 * | 2/2010 | Dearth et al. | 123/1 A |
| 7,676,321 B2 * | 3/2010 | Andri | 123/575 |
| 7,933,713 B2 * | 4/2011 | Leone | 701/123 |
| 2001/0035215 A1 | 11/2001 | Tipton et al. | |
| 2003/0089337 A1 | 5/2003 | Cohn et al. | |
| 2003/0127072 A1 | 7/2003 | Gmelin et al. | |
| 2004/0035395 A1 | 2/2004 | Heywood et al. | |
| 2004/0065274 A1 | 4/2004 | Cohn et al. | |
| 2004/0083717 A1 | 5/2004 | Zhu et al. | |
| 2004/0250790 A1 | 12/2004 | Heywood et al. | |
| 2004/0261763 A1 | 12/2004 | Hashimoto et al. | |
| 2005/0051135 A1 | 3/2005 | Tomoda et al. | |
| 2005/0066939 A1 | 3/2005 | Shimada et al. | |
| 2005/0097888 A1 | 5/2005 | Miyashita | |
| 2005/0103285 A1 | 5/2005 | Oda | |
| 2005/0109316 A1 | 5/2005 | Oda | |
| 2005/0109319 A1 | 5/2005 | Oda | |
| 2005/0155577 A1 | 7/2005 | Ichise et al. | |
| 2005/0155578 A1 | 7/2005 | Ichise et al. | |
| 2005/0166896 A1 | 8/2005 | Sadakane et al. | |
| 2005/0172931 A1 | 8/2005 | Mori | |
| 2005/0178356 A1 | 8/2005 | Shibagaki | |
| 2005/0178360 A1 | 8/2005 | Satou | |
| 2005/0183698 A1 | 8/2005 | Yonezawa | |
| 2005/0274353 A1 | 12/2005 | Okubo et al. | |
| 2006/0016429 A1 | 1/2006 | Mashiki | |
| 2006/0075991 A1 | 4/2006 | Heywood et al. | |
| 2006/0090732 A1 | 5/2006 | Shibagaki | |
| 2006/0102136 A1 | 5/2006 | Bromberg et al. | |
| 2006/0102145 A1 | 5/2006 | Cohn et al. | |
| 2006/0102146 A1 | 5/2006 | Cohn et al. | |
| 2006/0180099 A1 | 8/2006 | Aimoto et al. | |
| 2006/0191727 A1 | 8/2006 | Usami et al. | |
| 2007/0028861 A1 | 2/2007 | Kamio et al. | |
| 2007/0028905 A1 | 2/2007 | Shinagawa | |
| 2007/0034192 A1 | 2/2007 | Kamio et al. | |
| 2007/0119391 A1 | 5/2007 | Fried et al. | |
| 2007/0119392 A1 | 5/2007 | Leone et al. | |
| 2007/0119394 A1 | 5/2007 | Leone | |
| 2007/0119411 A1 | 5/2007 | Kerns | |
| 2007/0119412 A1 | 5/2007 | Leone et al. | |
| 2007/0119413 A1 | 5/2007 | Lewis et al. | |
| 2007/0119414 A1 | 5/2007 | Leone et al. | |
| 2007/0119415 A1 | 5/2007 | Lewis et al. | |
| 2007/0119416 A1 | 5/2007 | Boyarski | |
| 2007/0119421 A1 | 5/2007 | Lewis et al. | |
| 2007/0119422 A1 | 5/2007 | Lewis et al. | |
| 2007/0119425 A1 | 5/2007 | Lewis et al. | |
| 2007/0204813 A1 | 9/2007 | Arai et al. | |
| 2007/0215069 A1 | 9/2007 | Leone | |
| 2007/0215071 A1 | 9/2007 | Dearth et al. | |
| 2007/0215072 A1 | 9/2007 | Dearth et al. | |
| 2007/0215101 A1 | 9/2007 | Russell et al. | |
| 2007/0215102 A1 | 9/2007 | Russell et al. | |
| 2007/0215104 A1 | 9/2007 | Hahn | |
| 2007/0215110 A1 | 9/2007 | Stein et al. | |
| 2007/0215111 A1 | 9/2007 | Surnilla | |
| 2007/0215125 A1 | 9/2007 | Dearth et al. | |
| 2007/0215127 A1 | 9/2007 | Dearth et al. | |
| 2007/0215130 A1 | 9/2007 | Shelby et al. | |
| 2007/0219674 A1 | 9/2007 | Leone | |
| 2007/0219701 A1 | 9/2007 | Hashimoto et al. | |
| 2007/0221163 A1 | 9/2007 | Kamio | |
| 2007/0234976 A1 * | 10/2007 | Dearth et al. | 123/2 |
| 2007/0289573 A1 | 12/2007 | Leone et al. | |

| | | | |
|---|---|---|---|
| 2007/0295307 A1 | 12/2007 | Kerns | |
| 2009/0065409 A1 | 3/2009 | Kamio et al. | 210/123 |
| 2009/0095546 A1 | 4/2009 | Zubeck et al. | 180/54.1 |
| 2009/0159057 A1 | 6/2009 | Pursifull et al. | 123/575 |
| 2009/0178654 A1* | 7/2009 | Leone et al. | 60/605.1 |

FOREIGN PATENT DOCUMENTS

| | | | |
|---|---|---|---|
| EP | 1057988 | | 1/2006 |
| JP | 61065066 | | 4/1986 |
| JP | 62210229 A | | 9/1987 |
| JP | 01195926 A | * | 8/1989 |
| JP | 02070968 A | * | 3/1990 |
| JP | 5163976 A | | 6/1993 |
| JP | 2002227730 A | * | 8/2002 |
| JP | 2007/0756754 | | 3/2007 |
| WO | WO 9739235 A1 | * | 10/1997 |
| WO | WO 2004/097198 | | 11/2004 |
| WO | WO 2006/055540 | | 5/2006 |
| WO | WO 2007/106354 | | 9/2007 |
| WO | WO 2007/106416 | | 9/2007 |

OTHER PUBLICATIONS

Kamio, J. et al., "Study on HCCI-SI Combustion Using Fuels Containing Ethanol," SAE Technical Papers Series No. 2007-01-4051, Powertrain & Fluid Systems Conference & Exhibition, Rosemont IL., Oct. 29-Nov. 1, 2007, 12 pages.

Leone, Thomas G. et al., "On Board Water Addition for Fuel Separation System," U.S. Appl. No. 12/117,167, filed May 8, 2008, 25 pages.

Leone, Thomas G. et al., "Fuel System For Multi-Fuel Engine," U.S. Appl. No. 12/184,064, filed Jul. 31, 2008, 40 pages.

U.S. Appl. No. 60/780,319, filed Mar. 8, 2006, Bromberg et al.
U.S. Appl. No. 11/682,372, filed Mar. 6, 2007, Bromberg et al.
U.S. Appl. No. 11/782,050, filed Jul. 24, 2007, Bromberg et al.
U.S. Appl. No. 60/781,598, filed Mar. 10, 2006, Blumberg et al.
U.S. Appl. No. 11/683,564, filed Mar. 8, 2007, Bromberg et al.
U.S. Appl. No. 60/780,981, filed Mar. 10, 2006, Cohn et al.
U.S. Appl. No. 11/684,100, filed Mar. 9, 2007, Cohn et al.
U.S. Appl. No. 60/790,715, filed Apr. 10, 2006, Bromberg et al.
U.S. Appl. No. 60/746,507, filed May 5, 2006, Cohn et al.
U.S. Appl. No. 60/747,865, filed May 22, 2006, Heywood et al.
U.S. Appl. No. 60/832,836, filed Jul. 24, 2006, Bromberg et al.
U.S. Appl. No. 60/948,753, filed Jul. 10, 2007, Bromberg et al.
U.S. Appl. No. 60/973,499, filed Sep. 19, 2007, Bromberg.
U.S. Appl. No. 11/923,418, filed Oct. 24, 2007, Leone et al.
U.S. Appl. No. 11/924,395, filed Oct. 25, 2007, Brehob.
U.S. Appl. No. 11/464,172, filed Aug. 11, 2006, Stein.
U.S. Appl. No. 11/962,683, filed Dec. 21, 2007, Pursifull et al.
U.S. Appl. No. 11/955,246, filed Dec. 12, 2007, Pursifull et al.
U.S. Appl. No. 11/566,131, filed Dec. 1, 2006, Blumberg et al.
U.S. Appl. No. 11/776,120, filed Jul. 11, 2007, Stein et al.
U.S. Appl. No. 11/871,496, filed Oct. 12, 2007, Zubeck et al.

D.R. Crohn et al., "Direct Injection Ethanol Boosted Gasoline Engines: Biofuel Leveraging for Cost Effective Reduction of Oil Dependence and CO2 Emissions", Mar. 15, 2005, Massachusetts Institute of Techonology.

L. Bromberg et al., "Calculations of Knock Suppressions in Highly Turbocharged Gasoline/Ethanol Engines Using Direct Ethanol Injection", Jul. 7, 2005, Massachusetts Institute of Technology.

Stephen Russ, "A Review of the Effect of Engine Operating Conditions on Borderline Knock", SAE Technical Paper Series 960497, Feb. 26-29, 1996.

S. Brusca et al., "Water Injection in IC—SI Engines to Control Detonation and to Reduce Pollutant Emissions", SAE Technical Paper No. 2003-01-1912, May 19-22, 2003.

Hunter, M. Park, "1962 Oldsmobile JetFire," originally appeared in Special Interest Autos, Apr. 1996, http://www.tctc.com/~park/mph/pageCLIP/page62JET/62jet.htm, Nov. 7, 2006.

Vance, Bill, "Turbocharger Boosted Engine's Efficiency: Developed to maintain high-altitude performance," for the Calgary Herald Edmonton, http://www.ucalgary.ca/~csimpson/Articles/JetFire.html, Nov. 7, 2006.

Office Action of Chinese Application No. 200610148453.4, Issued Mar. 24, 2011, State Intellectual Property Office of PRC, 9 Pages.

* cited by examiner

ETHANOL SEPARATION USING AIR FROM TURBO COMPRESSOR

BACKGROUND AND SUMMARY

Engines may use various forms of fuel delivery to provide a desired amount of fuel for combustion in each cylinder. One type of fuel delivery uses a port injector for each cylinder to deliver fuel to respective cylinders. Still another type of fuel delivery uses a direct injector for each cylinder. Further, differential injection of gasoline and an alcohol (e.g., ethanol), may also be used to further improve engine performance.

One approach to on-board separation of fuel components may use heating to improve separation. For example, as described in U.S. Pat. No. 6,711,893, a mixed fuel may be heated by a heater prior to reaching a fuel separation device such that the overall efficiency of the fuel separation process is increased. Similarly, as described in US 2006/0191727, a mixed fuel may be heated via compression by a fuel pump prior to reaching an ethanol selection permeable membrane such that the overall efficiency of the fuel separation process is increased.

To address potential parasitic losses of such approaches, a method for operating an internal combustion engine with a compression device is provided, the method comprising: compressing a flow of engine intake air via the compression device; directing the flow of engine intake air to a first side of a membrane; directing a mixed fuel including at least a hydrocarbon component and an oxygenated component to an opposite side of the membrane; separating the mixed fuel into a first hydrocarbon-enriched fuel fraction and a second oxygenated-enriched fuel fraction by selectively diffusing at least a portion of the oxygenated-component through the membrane into the flow of engine intake air flowing along the first side of the membrane. The hydrocarbon-enriched fuel fraction may be delivered to the engine and/or to a storage tank, for example.

Thus, by utilizing air that has been heated by a compressor (e.g., a compressor of a turbocharger that is used to increase engine charging), separation may be improved while reducing parasitic losses. For example, even if parasitic heating is used in addition to compression heating, less parasitic heating may be used for a given operating condition. In other words, the heated air received by the separator from the compressor may increase the overall separation rate and efficiency of the separator while reducing heating by other potentially more parasitic approaches. Further, compressor operation may be adjusted based on performance of the separation, for example, such that increased compression heating, and increased boost, may be used when increased separation is requested.

Note that a side of a membrane may refer to one side of a planar membrane, as well as an inside or outside of a tubular membrane, or others, for example. Further, the membrane may be supported on a support structure and/or include additional components.

DETAILED DESCRIPTION

Figure 1:
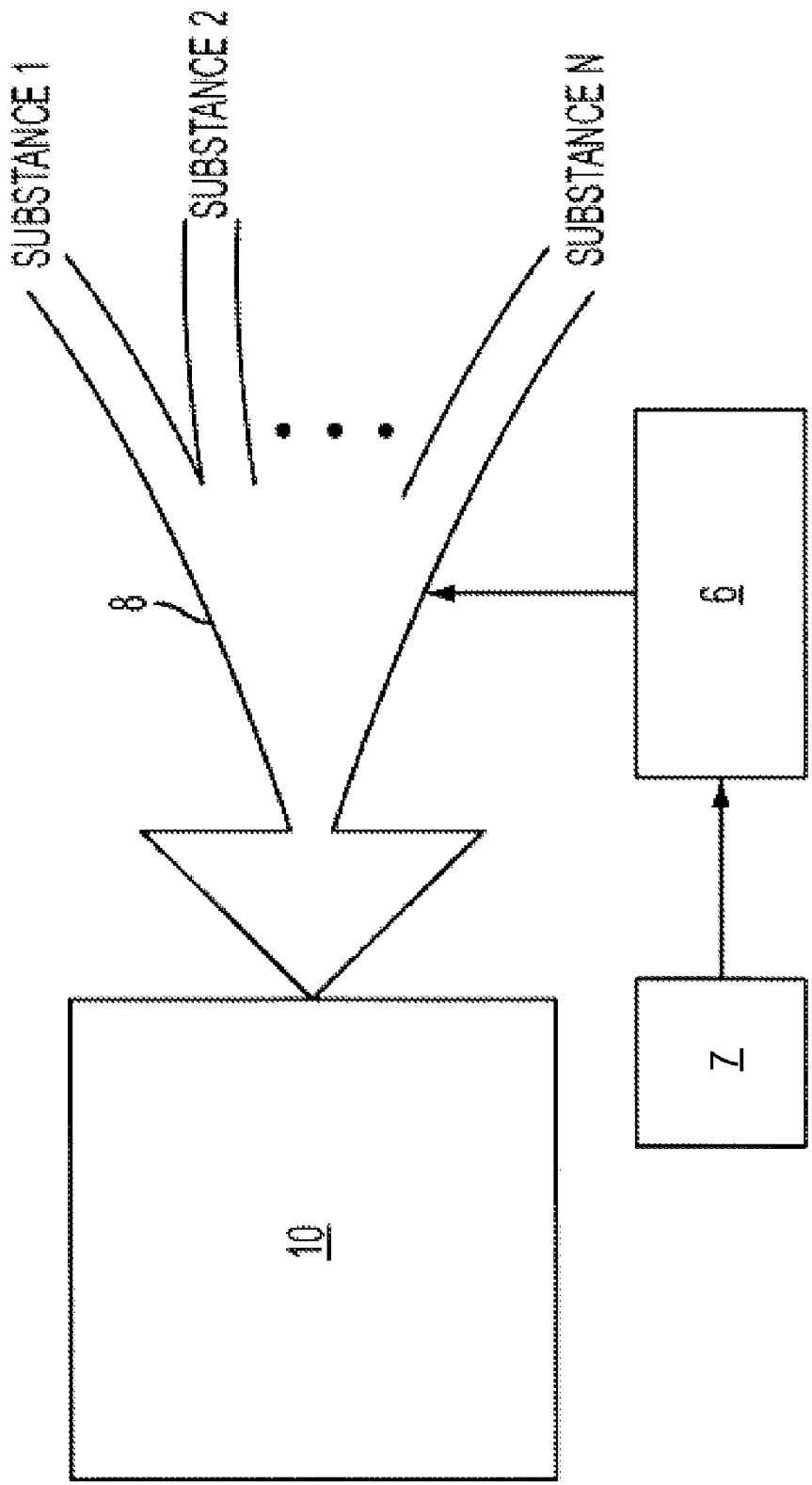
FIG. 1 shows a schematic diagram of a generic engine system.

FIG. 1 shows an engine 10 receiving delivery of a plurality of substances (1, 2, . . . , N) via arrow 8. The various substances may include multiple different fuel blends, injection locations, or various other alternatives. In one example, multiple different substances having different gasoline and/or alcohol and/or water, and/or other compound concentrations may be delivered to the engine, and may be delivered in a mixed state, or separately delivered. Further, the relative amounts and/or ratios of the different substances may be variably controlled by a controller 6 in response to operating conditions, which may be provided via sensor(s) 7. The controller 6 may form, along with various sensors and/or actuators, a control system. The control system may include one or more controllers to carry out various functions.

In one example, the different substances may represent different fuels having different levels of alcohol, including one substance being gasoline and the other being ethanol. In another example, engine 10 may use gasoline as a first substance and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gasoline), a mixture of an alcohol and water, a mixture of an alcohol, water, and gasoline, etc. as a second substance. In still another example, the first substance may be a gasoline alcohol blend with a lower alcohol concentration than a gasoline alcohol blend of a second substance. In yet another example, the first substance may be gasoline or diesel fuel, and the second substance may be a dimethyl ether, a methyl ester, a lower alkyl alcohol (such as methanol, ethanol, propanol, or butanol), or a mixture thereof.

In another embodiment, different injector locations may be used for different substances. For example, a single injector (such as a direct injector) may be used to inject a mixture of two substances (e.g., gasoline and an alcohol/water mixture), where the relative amount or ratio of the two or more fuel quantities or substances in the mixture may be varied during engine operation via adjustments made by controller 6 via a mixing valve (not shown), for example. In still another example, two different injectors for each cylinder are used, such as port and direct injectors, each injecting a different substance in different relative amounts as operating conditions vary. In even another embodiment, different sized injectors, in addition to different locations and different substances, may be used. In yet another embodiment, two port injectors with different spray patterns and/or aim points may be used.

Various advantageous results may be obtained by various combinations of the above systems. For example, when using both gasoline and a fuel having alcohol (e.g., ethanol), it may be possible to adjust the relative amounts of the fuels to take advantage of the increased charge cooling of alcohol fuels (e.g., via direct injection) to reduce the tendency of knock (e.g., in response to knock or increased load, increasing a relative amount of alcohol and/water). This phenomenon, combined with increased compression ratio, and/or boosting and/or engine downsizing, can then be used to obtain large fuel economy benefits (by reducing the knock limitations on the engine), while allowing engine operation on gasoline at lighter loads when knock is not a constraint. The knock suppression benefits offered by this phenomenon may be significantly larger than the benefits offered by the dual injection of hydrocarbon fuels with different octane ratings.

Figure 2:
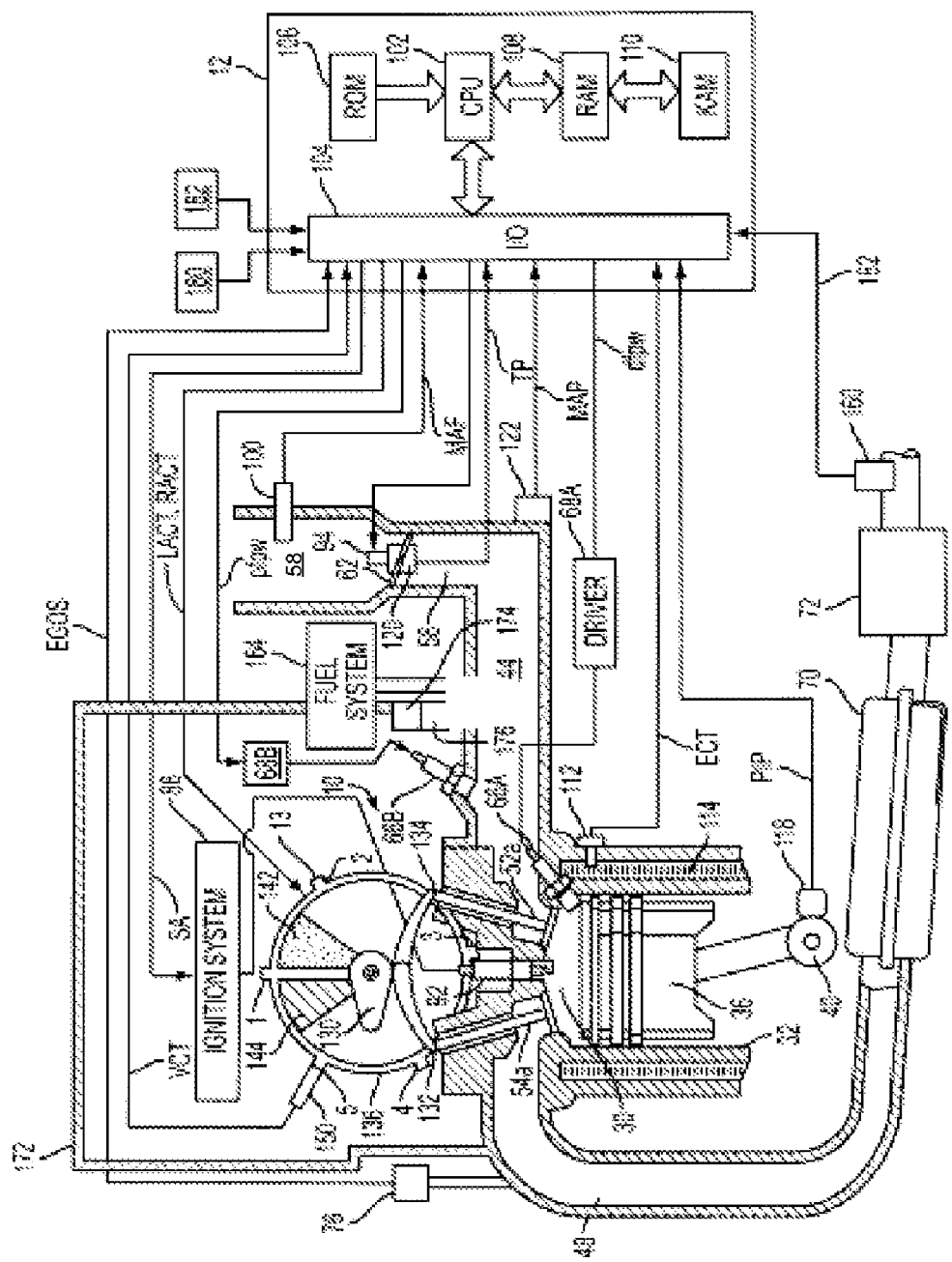
FIG. 2 shows a partial view of an exemplary embodiment of an engine.

Referring now to FIG. 2, it shows one cylinder of a multi-cylinder engine, as well as the intake and exhaust path connected to that cylinder. Further, FIG. 2 shows one example fuel system with two fuel injectors per cylinder, for at least one cylinder. In one embodiment, each cylinder of the engine may have two fuel injectors. The two injectors may be configured in various locations, such as two port injectors, one port injector and one direct injector (as shown in FIG. 2), or others.

Also, as described herein, there are various configurations of the cylinders, fuel injectors, and exhaust system, as well as various configurations for the fuel vapor purging system and exhaust gas oxygen sensor locations.

Continuing with FIG. 2, it shows a multiple injection system, where engine 10 has both direct and port fuel injection, as well as spark ignition. Internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used.

In one particular example, piston 36 may include a recess or bowl (not shown) to help in forming stratified charges of air and fuel, if desired. However, in an alternative embodiment, a flat piston may be used.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

Fuel injector 66A is shown directly coupled to combustion chamber 30 for delivering injected fuel directly therein in proportion to the pulse width of signal dfpw received from controller 12 via electronic driver 68A. While FIG. 2 shows injector 66A as a side injector, it may also be located overhead of the piston, such as near the position of spark plug 92. Such a position may improve mixing and combustion due to the lower volatility of some alcohol based fuels. Alternatively, the injector may be located overhead and near the intake valve to improve mixing.

Fuel and/or water may be delivered to fuel injector 66A by a high pressure fuel system (not shown) including a fuel tank, fuel pumps, and a fuel rail. Alternatively, fuel and/or water may be delivered by a single stage fuel pump at lower pressure, in which case the timing of the direct fuel injection may be more limited during the compression stroke than if a high pressure fuel system is used. Further, while not shown, the fuel tank (or tanks) may (each) have a pressure transducer providing a signal to controller 12.

Fuel injector 66B is shown coupled to intake manifold 44, rather than directly to cylinder 30. Fuel injector 66B delivers injected fuel in proportion to the pulse width of signal pfpw received from controller 12 via electronic driver 68B. Note that a single driver 68 may be used for both fuel injection systems, or multiple drivers may be used. Fuel system 164 is also shown in schematic form delivering vapors to intake manifold 44, where fuel system 164 is also coupled to injectors 66A and 66B (although not shown in this Figure). Various fuel systems and fuel vapor purge systems may be used.

Intake manifold 44 is shown communicating with throttle body 58 via throttle plate 62. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control. In an alternative embodiment (not shown), a bypass air passageway is arranged in parallel with throttle plate 62 to control inducted airflow during idle speed control via an idle control by-pass valve positioned within the air passageway.

Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gasses are rich of stoichiometry and a low voltage state of signal EGOS indicates exhaust gasses are lean of stoichiometry. Signal EGOS may be used to advantage during feedback air/fuel control to maintain average air/fuel at stoichiometry during a stoichiometric homogeneous mode of operation. Further details of air-fuel ratio control are included herein.

Distributorless ignition system 88 provides ignition spark to combustion chamber 30 via spark plug 92 in response to spark advance signal SA from controller 12.

Controller 12 may cause combustion chamber 30 to operate in a variety of combustion modes, including a homogeneous air/fuel mode and/or a stratified air/fuel mode by controlling injection timing, injection amounts, spray patterns, etc. Further, combined stratified and homogenous mixtures may be formed in the chamber. In one example, stratified layers may be formed by operating injector 66A during a compression stroke. In another example, a homogenous mixture may be formed by operating one or both of injectors 66A and 66B during an intake stroke (which may be open valve injection). In yet another example, a homogenous mixture may be formed by operating one or both of injectors 66A and 66B before an intake stroke (which may be closed valve injection). In still other examples, multiple injections from one or both of injectors 66A and 66B may be used during one or more strokes (e.g., intake, compression, exhaust, etc.). Even further examples may be where different injection timings and mixture formations are used under different conditions, as described below.

Controller 12 can control the amount of fuel delivered by fuel injectors 66A and 66B so that the homogeneous, stratified, or combined homogenous/stratified air/fuel mixture in chamber 30 can be selected to be at stoichiometry, a value rich of stoichiometry, or a value lean of stoichiometry.

While FIG. 2 shows two injectors for the cylinder, one being a direct injector and the other being a port injector, in an alternative embodiment two port injectors for the cylinder may be used, along with open valve injection, for example.

Emission control device 72 is shown positioned downstream of catalytic converter 70. Emission control device 72 may be a three-way catalyst or a NOx trap, or combinations thereof.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

Continuing with FIG. 2, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

While this example shows a system in which the intake and exhaust valve timing are controlled concurrently, variable intake cam timing, variable exhaust cam timing, dual independent variable cam timing, or fixed cam timing may be used. Further, variable valve lift may also be used. Further, camshaft profile switching may be used to provide different cam profiles under different operating conditions. Further still, the valvetrain may be roller finger follower, direct acting mechanical bucket, electromechanical, electrohydraulic, or other alternatives to rocker arms.

Continuing with the variable cam timing system, teeth, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 may also provide an indication of oxygen concentration in the exhaust gas via signal 162, which provides controller 12 a voltage indicative of the $O_2$ concentration. For example, sensor 160 can be a HEGO, UEGO, EGO, or other type of exhaust gas sensor. Also note that, as described above with regard to sensor 76, sensor 160 can correspond to various different sensors.

As described above, FIG. 2 merely shows one cylinder of a multi-cylinder engine, and it is understood that each cylinder has its own set of intake/exhaust valves, fuel injectors, spark plugs, etc.

Also, in the example embodiments described herein, the engine may be coupled to a starter motor (not shown) for starting the engine. The starter motor may be powered when the driver turns a key in the ignition switch on the steering column, for example. The starter is disengaged after engine starting, for example, by engine 10 reaching a predetermined speed after a predetermined time.

Continuing with FIG. 2, an exhaust gas recirculation system is shown. Exhaust gas is delivered to intake manifold 44 by a conventional EGR tube 172 communicating with exhaust manifold 48, EGR valve assembly 174, and EGR orifice 176. Alternatively, tube 172 could be an internally routed passage in the engine that communicates between exhaust manifold 48 and intake manifold 44. As will be described in further detail herein, EGR tube 172 (or another EGR tube or a branch (not shown) of EGR tube 172) may be configured to assist the fuel system in the separation of a mixed fuel.

As noted above, engine 10 may operate in various modes, including lean operation, rich operation, and "near stoichiometric" operation. "Near stoichiometric" operation can refer to oscillatory operation around the stoichiometric air fuel ratio. Typically, this oscillatory operation is governed by feedback from exhaust gas oxygen sensors. In this near stoichiometric operating mode, the engine may be operated within approximately one air-fuel ratio of the stoichiometric air-fuel ratio.

Feedback air-fuel ratio control may be used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) can be adjusted based on a desired air-fuel ratio and the air-fuel ratio from the sensor. Further still, individual cylinder air-fuel ratio control could be used, if desired. Adjustments may be made with injector 66A, 66B, or combinations thereof depending on various factors, to control engine air-fuel ratio.

Also note that various methods can be used to maintain the desired torque such as, for example, adjusting ignition timing, throttle position, variable cam timing position, exhaust gas recirculation amount, and number of cylinders carrying out combustion. Further, these variables can be individually adjusted for each cylinder to maintain cylinder balance among all the cylinders. While not shown in FIG. 2, engine 10 may be coupled to various boosting devices, such as a supercharger or turbocharger. On a boosted engine, desired torque may also be maintained by adjusting wastegate and/or compressor bypass valves.

Figure 3:
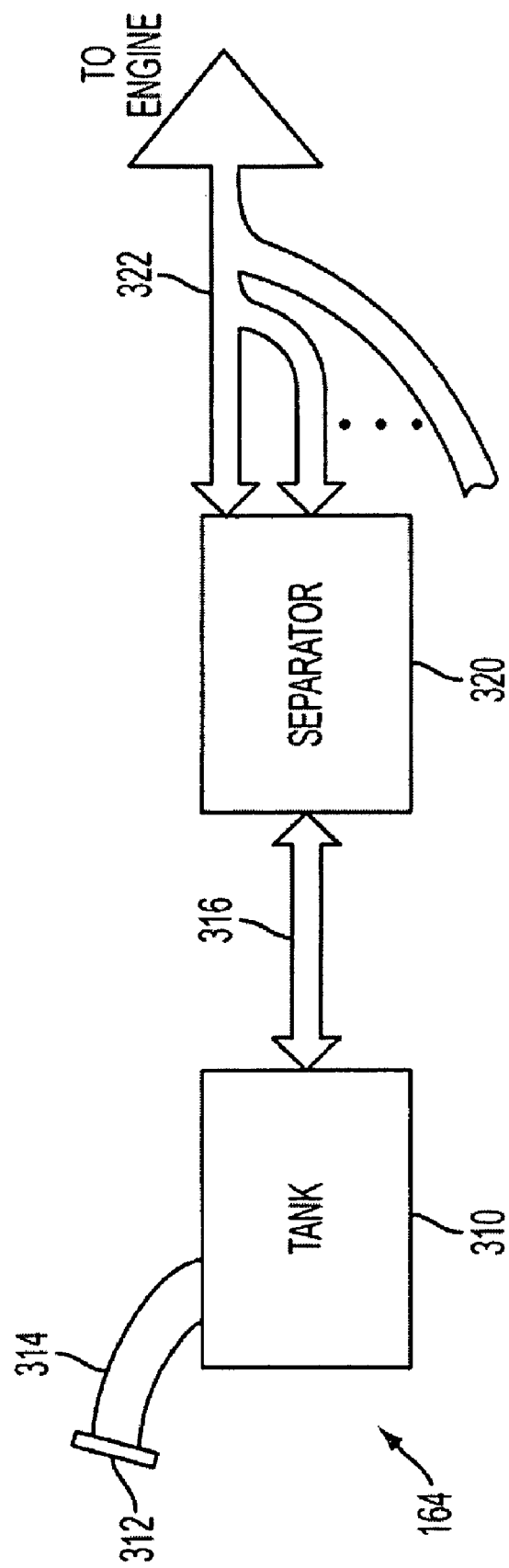
FIG. 3 shows an exemplary embodiment of a fuel system with a fuel separator.

Referring now to FIG. 3, an example fuel system layout is provided with fuel tank 310 having fuel fill cap 312. The system is configured to receive a fuel mixture through the fill line 314 and into tank 310, where the mixture may be a gasoline/alcohol mixture, a gasoline/alcohol/water mixture, or various others such as noted herein, including, a gasoline/ethanol mixture such as E10, for example. The fuel mixture in tank 310 may be transported to a separator system 320 via a transport system, shown by double arrow 316. The transport system 316 may be a one way transport, e.g., transporting the fuel mixture to the separator 320, or may enable two-way transportation, such as return lines from the separator or downstream fuel system back to the tank 310. The transport system 316 may include pumps, valves, multiple separate lines, or various other components, such as described below herein with regard to example systems. Further, while FIG. 3 shows the transport system 316 external to tank 310, system 316 along with separator 320 and/or portions of transport system 322 may also be located within or at least partially within tank 310.

Continuing with FIG. 3, it also shows downstream transport system 322 located between separator 320 and the engine (not shown). Transport system 322 is shown having at least two separate lines coupled to the separator to transport different amounts of substances or fuels with different constituents to the engine depending on operating conditions. Transport system 322 may maintain the different fuels separate in delivering the fuels to the engine, or may mix the fuels for co-delivery to the engine, as illustrated in FIG. 3. Further, like system 316, system 322 may include pumps, valves, multiple separate lines, return lines, or various other components, such as described below herein with regard to example systems.

Separator system 320 is configured to allow two or more components in the fuel mixture stored in tank 310 to be separated and provided separately to engine 10, thereby permitting the advantages of dual or mixed injection strategies to be employed without causing inconvenience to a user.

Figure 4:
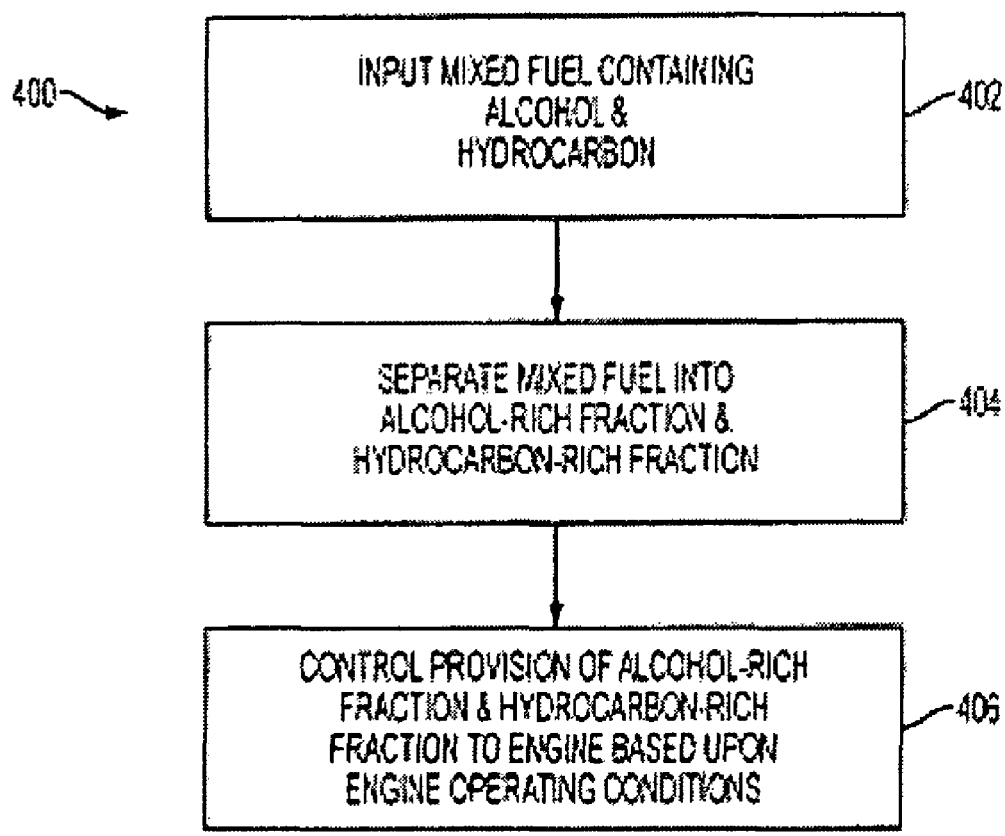
FIG. 4 shows a flow diagram of an exemplary embodiment of a method of operating a fuel system with a fuel separator.

FIG. 4 illustrates one exemplary embodiment of a method 400 of operating engine 10 via a fuel separation/mixed injection strategy. First, method 400 includes inputting a mixed fuel into tank 310, or receiving the mixed fuel into the tank. In the embodiment of FIG. 4, the mixed fuel contains a hydrocarbon component (such as gasoline) and an alcohol component (including but not limited to ethanol or methanol). However, it will be appreciated that any suitable mixed fuel may be used, including but not limited to other polar and/or oxygenated fuels such as ethers and esters and other nonpolar and/or hydrocarbon fuels such as diesel.

Next, method 400 includes separating, at 404, the mixed fuel into a hydrocarbon-enriched fraction and an alcohol-enriched fraction. As used herein, the terms "hydrocarbon-enriched" refers to the volume of fuel after separation from which either the alcohol was removed, or the volume of fuel containing hydrocarbons removed from the mixed fuel, depending upon whether the separator is configured to extract the hydrocarbon or alcohol components. Likewise, the term "alcohol-enriched" refers to the volume of fuel after separation from which either the hydrocarbon was removed, or the volume of fuel containing alcohols (or other oxygenated or polar fuels) removed from the hydrocarbon portion of the mixed fuel, depending upon the separation mechanism employed. It will be appreciated that the relative concentrations of the alcohol and hydrocarbon components of the "hydrocarbon-enriched" or "alcohol-enriched" fractions may be either higher or lower than the other respective component of those fractions. Furthermore, the term "fraction" is used herein merely to denote a volume of fuel after a separation process, and does not imply that any particular type of separation process is employed.

After separating the mixed fuel into at least the alcohol-enriched and hydrocarbon-enriched fractions, method 400 next includes, at 406, controlling the provision of fuel from the alcohol-enriched fraction and fuel from the hydrocarbon-enriched fraction to engine 10 based upon an engine operating condition. For example, if engine knock is detected, a greater relative amount of fuel from the alcohol-enriched fraction may be provided to reduce knock. As another example, a greater amount of fuel from the hydrocarbon-enriched fraction may be provided to the engine as an engine load increases, thereby providing a greater amount of energy to the engine. It will be appreciated that these are merely exemplary methods of controlling the provision of the alcohol-enriched fuel fraction and the hydrocarbon-enriched fuel fraction to engine 10, and that the relative amounts (or ratio) of fuels from these fractions may be adjusted based upon any other suitable engine operating conditions or for any other suitable purpose. Other examples include, but are not limited to, the reduction of emissions and/or the enhancement of fuel economy.

Figure 5:
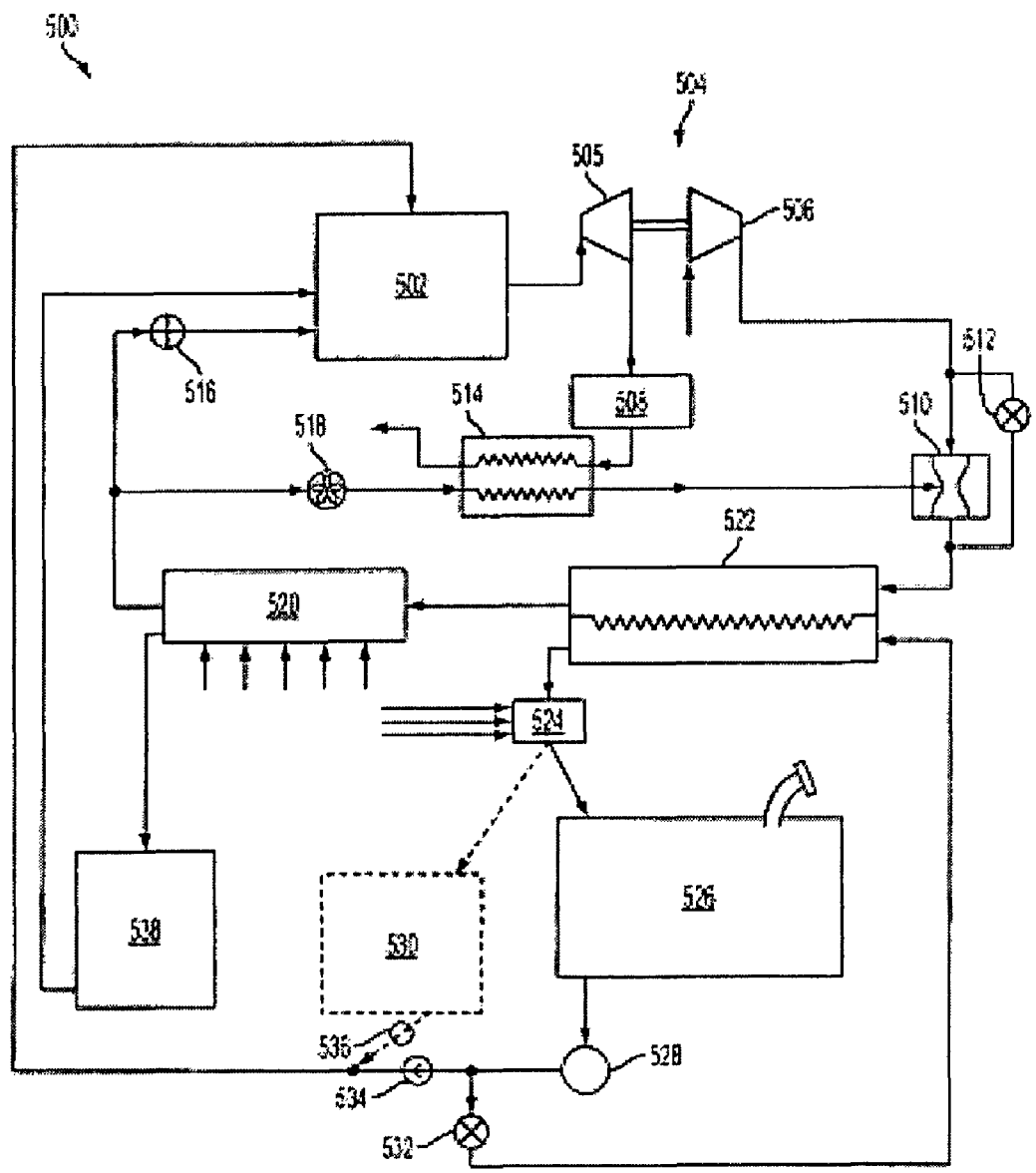
FIG. 5 shows a block diagram of another exemplary embodiment of a fuel system with a fuel separator.

FIG. 5 shows a block diagram of another exemplary embodiment of a fuel system with a fuel separator. As one non-limiting example, engine 502 produces a mechanical output by combusting a mixture of air and hydrocarbon and/or alcohol fuel. Further, engine 502 may be configured in a propulsion system for a vehicle. Alternatively, engine 502 may be operated in a stationary application, for example, as an electric generator. While fuel system 500 may be applicable to stationary applications, it should be appreciated that fuel system 500 as described herein, is particularly adapted for vehicle applications.

Fuel system 500 may include one or more of the following: a turbocharger 504 that receives exhaust gasses discharged by engine 502, a three-way catalyst 508 arranged downstream of turbocharger 504 for reducing emissions in the exhaust gas flow stream, a main fuel tank 526 that may hold a fuel that includes a hydrocarbon component (such as gasoline) and an alcohol component (including but not limited to ethanol or methanol), and an ethanol separator 522 that when activated may separate out a portion of the alcohol component from a volume of fuel received from main fuel tank 526. Turbocharger 504 may include a turbine 505 and a compressor 506 coupled on a common shaft. The blades of turbine 505 may be caused to rotate about the common shaft as a portion of the exhaust gas stream discharged from engine 502 impinges upon the blades of the turbine. Compressor 506 may be coupled to turbine 505 such that compressor 506 may be actuated when the blades of turbine 505 are caused to rotate. For example, a variable geometry turbocharger may be used. Further still, a compressor and/or turbine bypass, or wastegate, may be used. In one example, operation of the turbocharger (e.g., boost) may be adjusted based on separator performance to affect the amount of heating and thus separation rate.

Fuel system 500 may further include purified liquid ethanol tank 538, intercooler 520, fuel recirculation valve 532, venturi passage 510, venturi bypass valve 512, throttle 516, and pump 528. Ethanol separator 522 may receive a flow of air via venturi passage 510 or venturi bypass valve 512 that has been heated by compressor 506. Venturi passage 510 may include a lower-pressure section (e.g. reduced cross-sectional flow area section) that may create a "pull" that may aid in the subsequent circulation of heated air through ethanol separator 522. Venturi bypass valve 512 may be opened or partially opened when a wide-open throttle condition is present to reduce any pressure drop across venturi passage 510 that may occur during such a condition. The heated air delivered to ethanol separator 522 may be directed to the ethanol side of a membrane within ethanol separator 522. Likewise, fuel from main fuel tank 526 may be pumped to the ethanol-gasoline side of the membrane via pump 528 and fuel recirculation valve 532. The heat energy contained within the heated air flowing along the ethanol side of the membrane may induce the ethanol component of the fuel flowing along the ethanol-gasoline side of the membrane to selectively diffuse across the membrane into the heated air. The selective diffusion may result in both transfer of ethanol components and hydrocarbon components of the fuel, but with the ethanol components transferred at a higher rate, for example.

In some examples, the heated air fed to ethanol separator 522 may be independently heated—although this may create a parasitic energy loss on engine 502. Alternatively, or in addition, by using air that is already heated via compression by compressor 506 when engine 502 is under boost, this parasitic loss may be reduced.

The heated air exiting the ethanol side of ethanol separator 522 may contain ethanol vapor and may be directed to intercooler 520 which may include an air-to-air or air-to-water heat exchanger, for example, that may cool the heated air exited by ethanol separator 522. Once the heated air containing ethanol vapor is cooled by intercooler 520, resulting ethanol liquid condensate may be received by purified liquid ethanol tank 538. Correspondingly, a portion of the ethanol vapor may be passed on to engine 502 via throttle 516 (e.g. ethanol vapor that was not condensed into liquid ethanol by intercooler 520). Similarly, the fuel flowing along the ethanol-gasoline side of the membrane may then be directed to main fuel tank 526 (upon exiting ethanol separator 522 and having at least a portion of the ethanol component removed by the selective diffusion process, the fuel exited by ethanol separator 522 may be deemed "purified"). Fuel within main fuel tank 526 may be pumped to engine 502 for combustion.

In some embodiments, an optional check valve 534 may be located downstream of pump 528 and upstream of engine 502 to prevent backflow to main fuel tank 526 and/or an optional fuel cooler 524 may be located downstream of the ethanol-gasoline side of the membrane within ethanol separator 522 and upstream of main fuel tank 526. Optional fuel cooler 524, which may include an air-to-air or air-to-water heat exchanger, for example, may cool the purified fuel exited by ethanol separator 522 and may thus reduce the temperature of purified fuel returned to main fuel tank 526 (and/or to optional purified gasoline tank 530 as described below). In other embodiments, fuel system 500 may further include optional pump 536 and optional purified gasoline tank 530 (which may receive a portion of the purified fuel exited by ethanol separator 522 and optional pump 536). Optional pump 536 may pump purified fuel from purified gasoline tank 530 to engine 502 for combustion.

In some embodiments, fuel system 500 may further include an optional heat exchanger 514 and an optional recirculation fan 518. This would allow for a recirculating loop that would supply hot air to the membrane integral to ethanol separator 522 when the engine is not under boost (e.g. when turbocharger 504 is not activated). The size and weight of the ethanol separator 522 (and hence the cost of the system) may thereby be reduced because some ethanol could be separated and stored when the engine is not under boost and little ethanol is consumed. Optional heat exchanger 514 may increase the efficiency of ethanol separator 522 (and may offset any parasitic energy loss manifested by optional recirculation fan 518) by providing additional heat energy to the ethanol separator by capturing a portion of the heat energy stored within exhaust gasses exited by turbo 504 that otherwise would be discharged to the surrounding environment. Optional heat exchanger 514 may receive exhaust gasses from catalyst 508 and cooled air that may contain ethanol vapor from intercooler 520 (via optional recirculation fan 518). The heat energy stored within the exhaust gasses received by optional heat exchanger 514 from oxidation catalyst 508 may be absorbed by the cooled air received by optional heat exchanger 514 from fan 518. The temperature of the cooled air received by optional heat exchanger 514 from fan 518 may thereby be increased. The exhaust gasses that were received by optional heat exchanger 514 from the catalyst may then be exited to the surrounding environment via a tailpipe (not shown in FIG. 5).

The air received from optional recirculation fan 518 and heated by optional heat exchanger 514 may then be directed to ethanol separator 522 via venturi passage 510 where the heated air may facilitate the separation of a portion of the ethanol component from the fuel stored by main fuel tank 526 and processed by ethanol separator 522 (via selective diffusion across the membrane integral to ethanol separator 522). Furthermore, optional recirculation fan 518 may act to control the rate of ethanol separation by ethanol separator 522 by adjusting the amount of air that is directed to optional heat exchanger 514 to be heated and subsequently directed to ethanol separator 522 via venturi passage 510. A distinct advantage of such a recirculation loop is that ethanol vapor (e.g. ethanol that wasn't transformed to liquid ethanol during a previous pass through intercooler 520) may be re-processed through ethanol separator 522. Thus, the recirculation loop may allow less ethanol vapor to be passed on to engine 502 and correspondingly the amount of liquid ethanol separated by ethanol separator 522 and passed on to liquid ethanol tank 538 may be increased. The amount of ethanol vapor that is received by engine 502 from intercooler 520 via throttle 516 may be estimated and used for a feed-forward adjustment of fuel injection pulsewidth to maintain a desired air/fuel ratio. The estimate of ethanol vapor received by engine 502 from intercooler 520 via throttle 516 may be based on empirical system testing data or on a mathematical model that may account for such system variables as intercooler pressure, intercooler temperature, the volumetric flow rate of ethanol vapor entering the intercooler from the membrane, the rate of liquid ethanol condensation in the intercooler, for example. Furthermore, the adjustment of fuel injection pulsewidth (based on an estimate and/or measurement and/or inference of the amount of ethanol vapor received by engine 502 from intercooler 520 via throttle 516) may be refined by feedback from the exhaust oxygen sensor (not shown in FIG. 5).

Purified liquid ethanol may be directly injected into combustion chambers within engine 502. The injection of purified liquid ethanol may be in direct response to a detected engine "knocking" condition and the parameters of the injection (e.g. injection pressure, duration, etc.) may be based on various operating variables such as air/fuel ratio, accelerator actuation, and degree of knocking detected. The direct injection of the liquid ethanol when used with an engine that utilizes port fuel injection typically requires separate supplies of both ethanol and gasoline (or the use of a fuel mixture that is predominantly ethanol such as E85, which is not currently widely available). By using an ethanol separator as described herein, however, more readily available fuels, such as E10, (which is approximately 10% ethanol by volume) may be utilized. Thus, by utilizing an ethanol separator as described herein, a single fuel type may be used for internal combustion via port fuel injection and a separated ethanol component of the fuel may be used for direct injection to reduce knocking, increasing overall engine performance and increasing the service life of vital engine components.

Figure 6:
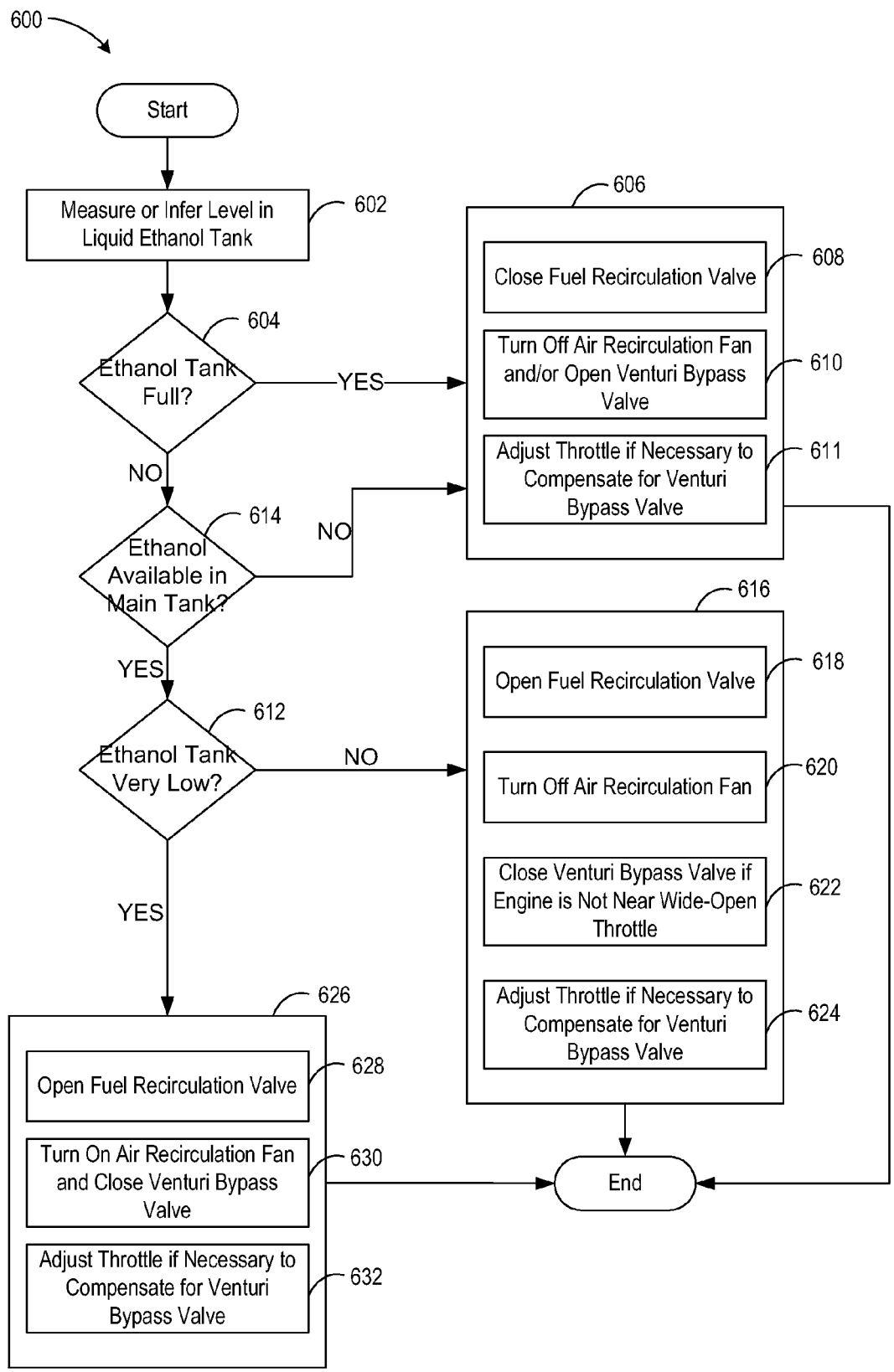
FIG. 6 shows a flow diagram of an exemplary embodiment of a method of controlling the fuel system with a fuel separator of FIG. 5.

FIG. 6 shows a flow diagram of an exemplary embodiment of a method of controlling the fuel system with a fuel separator of FIG. 5. At 602, the level of liquid ethanol in liquid ethanol tank 538 may be measured or inferred (e.g. inferred from the history of ethanol usage and/or separation rate). At 604, it may be determined whether liquid ethanol tank 538 is full. If the answer at 604 is yes, then the routine may proceed to 606. If the answer at 604 is no, the routine may then proceed to 614 where it may be determined whether there is ethanol available in main fuel tank 526. If the answer at 614 is no, then separation of ethanol by ethanol separator 522 should be arrested and the routine may proceed to 606. In some embodiments, the ethanol concentration in main fuel tank 526 may be measured with a sensor. In other embodiments, the ethanol concentration in main fuel tank 526 may be inferred from feedback from an exhaust oxygen sensor, for example.

At 606, intermediary steps may be taken to arrest the separation of ethanol by ethanol separator 522. These steps may include closing fuel recirculation valve 532 at 608, turning off optional air recirculation fan 518 and/or opening venturi bypass valve 512 at 610, and adjusting throttle 516 (if necessary) to compensate for the opening of venturi bypass valve 512 at 611. If the answer at 614 is yes, then the routine may proceed to 612 whether it may be determined whether liquid ethanol tank 538 is very low (for example, below half-full or below one-quarter full). If the answer at 612 is no, then the routine may proceed to 616. If the answer at 612 is yes, the routine may proceed to 626.

At 616, intermediary steps may be taken to allow separation of ethanol by ethanol separator 522 with minimal parasitic losses. At 618, fuel recirculation valve 532 may be opened. At 620, optional recirculation fan 518 may be turned off. At 622, venturi bypass valve 512 may be closed if throttle 516 is not near a wide-open throttle condition. At 624, throttle 516 may be adjusted to compensate for the closing of venturi bypass valve 512.

At 626, intermediary steps may be taken to increase the separation of ethanol by ethanol separator 522 so that the rate at which liquid ethanol tank 538 is replenished is maximized, although this may incur some parasitic losses. At 628, fuel recirculation valve 532 may be opened. At 630, optional air recirculation fan 518 may be turned on and/or venturi bypass valve 512 may be closed. At 632, throttle 516 may be adjusted to compensate for the closed of venturi bypass valve 512 (if venturi bypass valve 512 was closed at 630).

Additionally, separation may be adjusted by varying an amount of intake manifold pressure boost, such as by varying operation of the turbocharger. For example, if ethanol storage is low and/or increased ethanol direct injection is generated for a given operating condition, the boost may be increased (e.g., by decreasing wastegate operation, adjusting turbine geometry, etc.) thereby increasing intake air heating and increasing separation rate. Such action may be taken in addition to, or in place of, the various operations noted above with regard to FIG. 6, for example.

Figure 7:
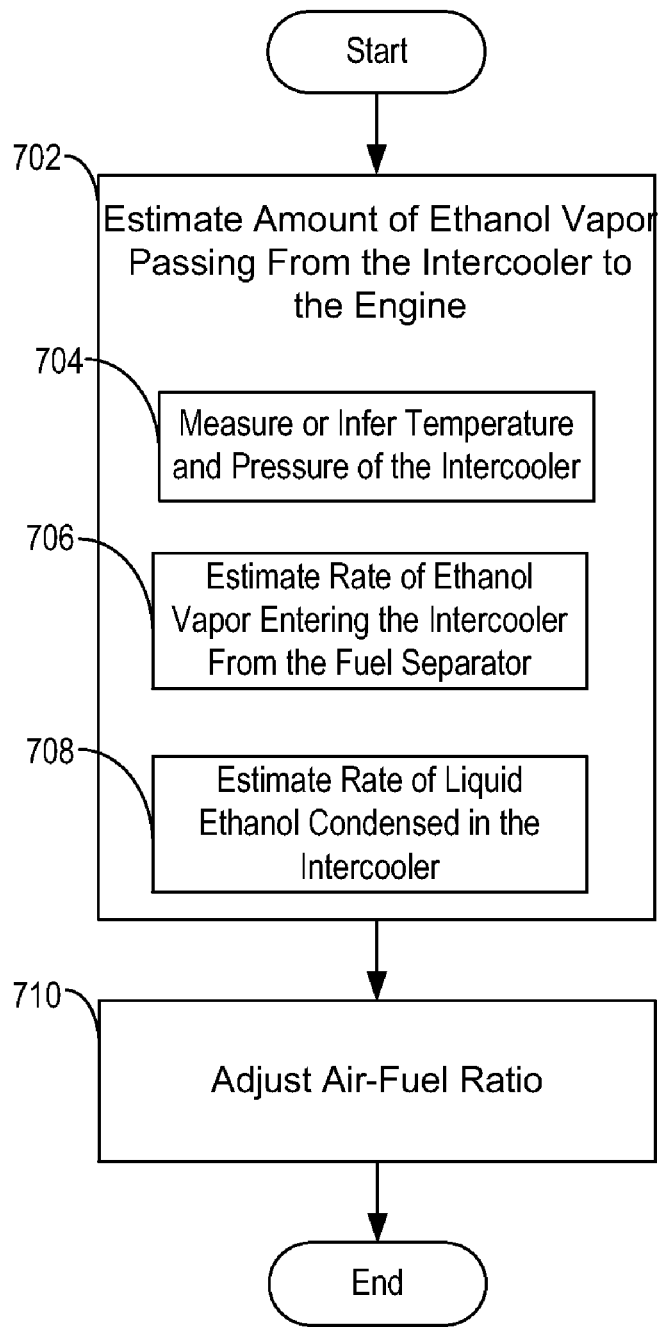
FIG. 7 shows a flow diagram of an exemplary embodiment of a method of estimating the amount of ethanol vapor passed on to the engine from the fuel separator of FIG. 5 and adjusting the air-fuel ratio in response thereto.

FIG. 7 shows a flow diagram of an exemplary embodiment of a method of estimating the amount of ethanol vapor passed on to the engine from the fuel separator of FIG. 5 and adjusting the air-fuel ratio in response thereto. At 702, the amount of ethanol vapor passed on to engine 502 from fuel separator 522 may be estimated. This estimation may account for several factors, examples of which are provided at 704, 706, and 708. At 704, the temperature and pressure of intercooler 520 may be measured (via a sensor(s)) or may be inferred from other operating condition(s). At 706, the rate of ethanol vapor entering intercooler 520 from fuel separator 522 may be estimated. At 708, the rate of liquid ethanol condensed by intercooler 520 and passed on to liquid ethanol tank 538 may be inferred or measured, for example using a fluid level measurement in liquid ethanol tank 538 and/or by a flow meter arranged downstream of intercooler 520 and upstream of liquid ethanol tank 538. At 710, the air-fuel ratio may be adjusted in response to the estimated amount of ethanol vapor passed on to engine 502 from intercooler 520. This may include adjusting the fuel injection pulsewidth, and/or fuel injection pressure, for example. Adjusting the air-fuel ratio in this way may allow for the engine to be operated closer to the stoichiometric ratio and increase overall fuel economy.

Figure 8:
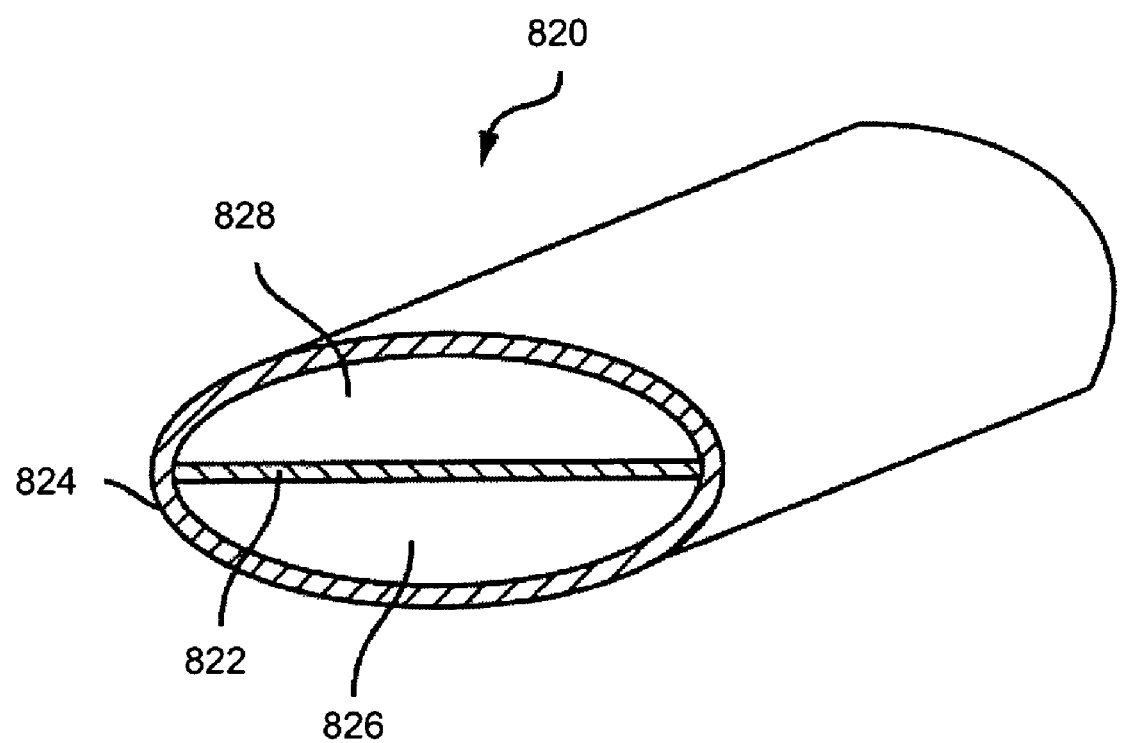
FIG. 8 shows a sectional view of an exemplary embodiment of a fuel separator.

FIG. 8 shows another exemplary embodiment of a separator, generally at 820. Separator 820 includes a selective membrane 822 and an outer wall 824 that divides an interior defined by the outer wall into a first passageway 826 (e.g. ethanol-gasoline side or ethanol side) and a second passageway 828 (e.g. ethanol-gasoline side or ethanol side). Selective membrane 822 takes the form of a linear membrane disposed across the interior of outer wall 824. In some embodiments, selective membrane 822 may be constructed with a sulfonated tetrafluorothylene copolymer, such as Nafion. Other embodiments may configure selective membrane 822 to be constructed of another suitable polymeric material(s). Mixed fuel may be provided to one of first passageway 826 and second passageway 828, and an extracted fuel component may be recovered from the other of first passageway 826 and 828. Depending upon the material used for selective membrane 822, selective membrane 822 may include a rigid support material (for example, a metal such as zirconia or ceramic material) that supports the selective membrane material. Such a rigid membrane material may help to support the selective membrane material against elevated pressures that may be used in the fuel separation process. In other embodiments, the selective membrane material may be sufficiently strong and rigid to allow the omission of a support.

Figure 9:
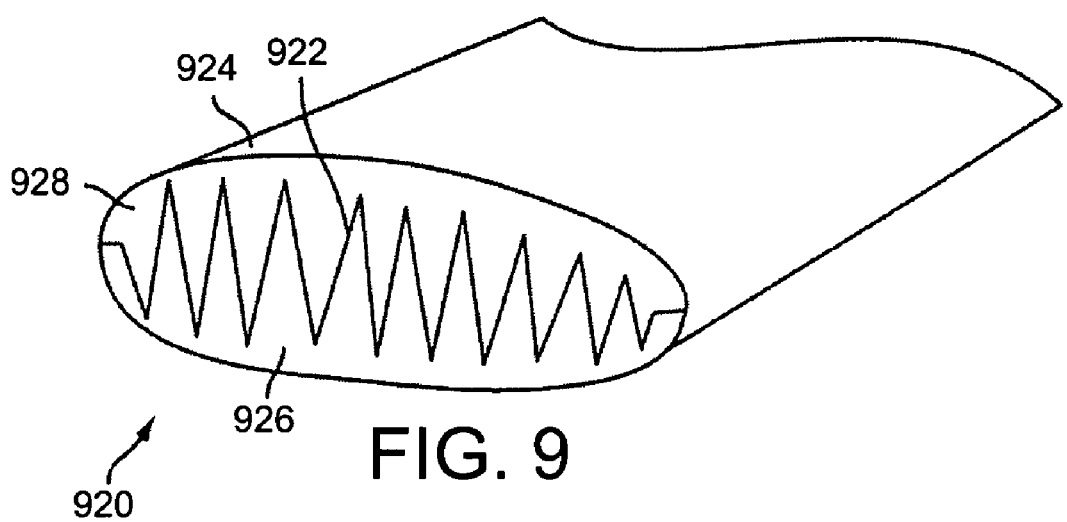
FIG. 9 shows a sectional view of another exemplary embodiment of a fuel separator.

FIG. 9 shows another exemplary embodiment of an ethanol separator, generally at 920. Ethanol separator 920 is similar to the other embodiments described above in that it includes a selective membrane 922 and an outer wall 924 that divides an interior defined by the outer wall into a first passageway 926 (e.g. ethanol-gasoline side or ethanol side) and a second passageway 928 (e.g. ethanol-gasoline side or ethanol side). However, selective membrane 922 takes the form of a folded or pleated membrane, instead of a linear membrane. In other embodiments, a honeycomb shaped membrane may be used instead of a linear membrane. In some embodiments, selective membrane 922 may be constructed with a sulfonated tetrafluorothylene copolymer, such as Nafion. Other embodiments may configure selective membrane 922 to be constructed of another suitable polymeric material(s). Mixed fuel may be provided to one of first passageway 926 and second passageway 928, and an extracted fuel component may be recovered from the other of first passageway 926 and 928. The use of a folded membrane, pleated membrane, or honeycomb-shaped membrane, as opposed to a linear membrane may help to increase the surface area of the selective membrane, and therefore may help to increase fuel separation rates as the diffusion rate of ethanol is proportional to membrane surface area.

In some embodiments, the performance of a separator may be monitored to provide a greater degree of control over the separator. The performance of the separator may be monitored in any suitable manner. For example, a separation rate may be inferred or calculated from variables such as the temperature of the separator, the flow rate of the mixed fuel into the separator, the pressure of the mixed fuel within the separator, the composition of the mixed fuel, and/or the pressure and/or flow rate of recirculated gasses (or other extraction fluid) within the separator. Furthermore, the separation rate also may be calculated by measuring the caloric content (for example, via a UEGO sensor) of the extracted fluid, and/or by optically measuring an alcohol content of a liquid-phase extraction fluid, where the extracted fluid is an alcohol. It will be appreciated that these are merely exemplary methods of monitoring, calculating or estimating a performance of a separator, and that any suitable method may be used.

The various example routines described herein may be carried out by the control system. Further, the control routines included herein can be used with various engine configurations. The specific routine described herein may represent one or more of any number of processing strategies such as event-driven, interrupt-driven, multi-tasking, multi-threading, and the like. As such, various steps, actions, or functions illustrated may be performed in the sequence illustrated, in parallel, or in some cases omitted. Likewise, the order of processing may not necessarily be required to achieve the features and/or functions of the example embodiments, but may be provided for ease of illustration and description. Although not explicitly illustrated, one or more of the illustrated steps, actions, or functions may be repeatedly performed depending on the particular strategy being used. Further, the flowchart(s) may graphically represent code to be programmed into computer readable storage medium in the controller, for example.

The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an internal combustion engine with a compression device, the method comprising:
   compressing a flow of engine intake air via the compression device;
   directing the flow of engine intake air to a first side of a membrane;
   directing a mixed fuel including at least a hydrocarbon component and an oxygenated component to an opposite side of the membrane;
   separating the mixed fuel into a first hydrocarbon-enriched fuel fraction and a second oxygenated-enriched fuel fraction by selectively diffusing at least a portion of the oxygenated-component through the membrane into the flow of engine intake air flowing along the first side of the membrane.

2. The method of claim 1, wherein an intercooler receives the oxygenated-enriched fuel fraction suspended within the flow of engine intake air and cools the flow of engine intake air to produce a cooled air flow, and at least a portion of the oxygenated-enriched fuel fraction is condensed into a liquid condensate.

3. The method of claim 2, wherein the cooled air flow with at least a portion of the oxygenated-enriched fuel fraction suspended therein is heated within a heat exchanger and recirculated to the first side of the membrane.

4. The method of claim 3, wherein the engine further includes a turbocharger, the heat exchanger receives an exhaust gas flow from the turbocharger, and heat energy within the exhaust gas flow is transferred to the cooled air flow via the heat exchanger.

5. The method of claim 3, wherein the cooled air flow is impelled to flow from the intercooler to the first side of the membrane by a fan and a venturi passage.

6. The method of claim 2, wherein at least a portion of the liquid condensate is directly injected into a combustion chamber of the engine for combustion.

7. The method of claim 6, wherein the liquid condensate injection amount is based on at least one operating condition.

8. The method of claim 2, wherein an air-fuel ratio within the combustion chamber is adjusted in response to an amount of ethanol vapor passed on to the engine from the intercooler.

9. The method of claim 1, wherein at least a portion of the flow of engine intake air is delivered to a combustion chamber of the engine.

10. The method of claim 1, wherein an air-fuel ratio within the combustion chamber is adjusted in response to an estimation of an amount of ethanol vapor passed on to the engine from the first side of the selective membrane, and where the compressing is adjusted to adjust the separation.

11. The method of claim 1, wherein at least a portion of the first hydrocarbon-enriched fuel is cooled by a fuel cooler, received by a purified gasoline tank, and injected into a combustion chamber of the engine.

12. A method for operating an internal combustion engine with a compression device, the method comprising:

compressing a flow of engine intake air via the compression device;

directing the flow of engine intake air to a separation membrane;

directing a mixed fuel including at least gasoline and ethanol to the membrane;

diffusing ethanol across the membrane at a faster rate than gasoline into the flow of engine intake air;

condensing at least a portion of the diffused ethanol out of the intake air, and delivering the condensed ethanol directly to a cylinder of the engine;

delivering any remaining ethanol in the intake air into the intake of the engine; and delivering the mixed fuel to the cylinder of the engine.

13. A system for an engine, comprising:

a fuel tank containing a mixed fuel that includes a hydrocarbon component and an oxygenated component;

a compression device for compressing a flow of engine intake air, the compression device coupled to a turbine in an exhaust system of the engine;

a selective membrane with a first side and an opposite side, where the first side of the selective membrane receives a flow of engine intake air from the compression device, the opposite side of the selective membrane receives a flow of the mixed fuel from the fuel tank, and the mixed fuel is separated into a first hydrocarbon-enriched fuel fraction and a second oxygenated-enriched fuel fraction by selective diffusion of at least a portion of the oxygenated-component through the membrane into the flow of engine intake air flowing along the first side of the membrane.

14. The system of claim 13, wherein an intercooler receives the oxygenated-enriched fuel fraction suspended within the flow of engine intake air and cools the flow of engine intake air to produce a cooled air flow, and at least a portion of the oxygenated-enriched fuel fraction is condensed into a liquid condensate.

15. The system of claim 14, wherein the cooled air flow with at least a portion of the oxygenated-enriched fuel fraction suspended therein is heated within a heat exchanger and recirculated to the first side of the selective membrane.

16. The system of claim 15, wherein the heat exchanger receives an exhaust gas flow from the turbine, and heat energy within the exhaust gas flow is absorbed by the cooled air flow via the heat exchanger.

17. The system of claim 16, wherein the system further includes a fan and a venturi passage and the cooled air flow is impelled to flow from the intercooler to the first side of the membrane by the fan and the venturi passage.

18. The system of claim 14, wherein at least a portion of the liquid condensate is directly injected into a combustion chamber of the engine for combustion.

19. The system of claim 18, wherein the liquid condensate injection amount is based on at least one operating condition.

20. The system of claim 14, wherein an air-fuel ratio within the combustion chamber is adjusted in response to an amount of ethanol vapor passed on to the engine from the intercooler.

21. The system of claim 13, wherein at least a portion of the flow of engine intake air is delivered to a combustion chamber of the engine.

22. The system of claim 21, wherein an air-fuel ratio within the combustion chamber is adjusted in response to an estimation of an amount of ethanol vapor passed on to the engine from the first side of the selective membrane.

23. The system of claim 13, wherein at least a portion of the first hydrocarbon-enriched fuel fraction is cooled by a fuel cooler, received by a purified gasoline tank, and injected into a combustion chamber of the engine.

* * * * *